(12) United States Patent
Shin et al.

(10) Patent No.: US 11,573,456 B2
(45) Date of Patent: Feb. 7, 2023

(54) LIQUID CRYSTAL DISPLAY DEVICE

(71) Applicant: LG CHEM, LTD., Seoul (KR)

(72) Inventors: Nayoung Shin, Daejeon (KR); Junwon Chang, Daejeon (KR); Moon Soo Park, Daejeon (KR); Kyun Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 73 days.

(21) Appl. No.: 16/965,587

(22) PCT Filed: Jun. 4, 2019

(86) PCT No.: PCT/KR2019/006711
§ 371 (c)(1),
(2) Date: Jul. 28, 2020

(87) PCT Pub. No.: WO2019/235807
PCT Pub. Date: Dec. 12, 2019

(65) Prior Publication Data
US 2021/0048715 A1    Feb. 18, 2021

(30) Foreign Application Priority Data

Jun. 5, 2018  (KR) .................. 10-2018-0064882

(51) Int. Cl.
*G02F 1/13363* (2006.01)
*G02F 1/1335* (2006.01)

(52) U.S. Cl.
CPC .. *G02F 1/133634* (2013.01); *G02F 1/133528* (2013.01); *G02F 1/133531* (2021.01); *G02F 1/133638* (2021.01); *G02F 2413/03* (2013.01); *G02F 2413/04* (2013.01); *G02F 2413/07* (2013.01); *G02F 2413/10* (2013.01); *G02F 2413/13* (2013.01); *G02F 2413/14* (2013.01)

(58) Field of Classification Search
CPC ........... G02F 1/133638; G02F 1/13363; G02F 2413/03; G02F 2413/04
See application file for complete search history.

(56) References Cited

U.S. PATENT DOCUMENTS

| | | |
|---|---|---|
| 2006/0103798 A1 | 5/2006 | Jang et al. |
| 2006/0285051 A1 | 12/2006 | Jeon et al. |
| 2007/0024780 A1 | 2/2007 | Kim et al. |

(Continued)

FOREIGN PATENT DOCUMENTS

| | | |
|---|---|---|
| CN | 101833197 A | 9/2007 |
| CN | 101114075 A | 1/2008 |

(Continued)

*Primary Examiner* — Alexander P Gross
(74) *Attorney, Agent, or Firm* — Dentons US LLP

(57) ABSTRACT

This application relates to a liquid crystal display which comprises: an upper polarizer; a lower polarizer; and a liquid crystal panel provided between the upper polarizer and the lower polarizer, in which the upper polarizer and the lower polarizer are provided so that absorption axes of the upper and lower polarizers are parallel to each other, a first half wave plate, a positive C plate, and a second half wave plate are sequentially comprised between the upper polarizer and the liquid crystal panel, and the liquid crystal panel is a vertical alignment liquid crystal mode.

13 Claims, 8 Drawing Sheets

(56) References Cited

U.S. PATENT DOCUMENTS

| | | | |
|---|---|---|---|
| 2008/0024700 A1* | 1/2008 | Yoshimi | G02F 1/13363 349/96 |
| 2009/0174857 A1 | 7/2009 | Amimori et al. | |
| 2009/0244474 A1 | 10/2009 | Fuchida et al. | |
| 2010/0149459 A1 | 6/2010 | Yabuta et al. | |
| 2010/0201924 A1 | 8/2010 | Wu et al. | |
| 2012/0249931 A1 | 10/2012 | Tamaki et al. | |
| 2013/0050618 A1 | 2/2013 | Lo et al. | |
| 2014/0293194 A1 | 10/2014 | Kang et al. | |
| 2014/0340617 A1* | 11/2014 | Yanai | G02F 1/133634 349/96 |
| 2015/0015830 A1* | 1/2015 | Kim | G02F 1/133528 349/96 |

FOREIGN PATENT DOCUMENTS

| | | | | |
|---|---|---|---|---|
| CN | 101151559 A | | 3/2008 | |
| CN | 101681061 A | | 3/2010 | |
| CN | 1954244 B | * | 7/2010 | ........... G02B 5/3083 |
| JP | 2008-134545 A | | 6/2008 | |
| JP | 2009-31402 A | | 2/2009 | |
| JP | 2009251035 A | | 10/2009 | |
| JP | 2010055118 A | | 3/2010 | |
| JP | 2012-208212 A | | 10/2012 | |
| JP | 2015-40904 A | | 3/2015 | |
| JP | 2018-60149 A | | 4/2018 | |
| KR | 10-2006-0130502 A | | 12/2006 | |
| KR | 10-2007-0081259 A | | 8/2007 | |
| KR | 1020070082768 A | | 8/2007 | |
| KR | 10-1293564 B1 | | 8/2013 | |
| KR | 10-2015-0122410 A | | 11/2015 | |
| KR | 10-2015-0130549 A | | 11/2015 | |
| KR | 10-2016-0112380 A | | 9/2016 | |
| KR | 10-2017-0115633 A | | 10/2017 | |
| KR | 10-2018-0047609 A | | 5/2018 | |

* cited by examiner

[Figure 1]
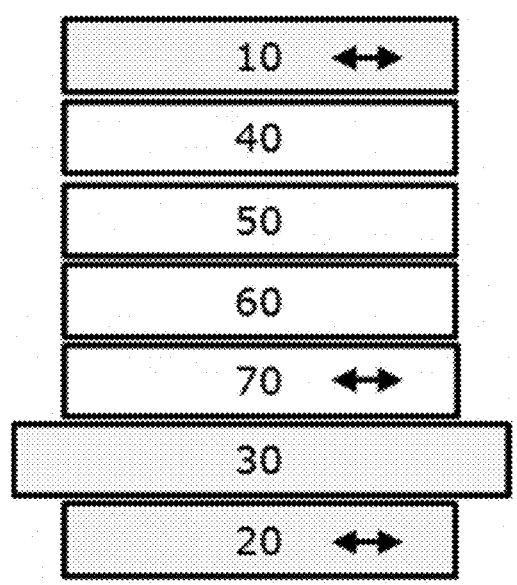

[Figure 2]
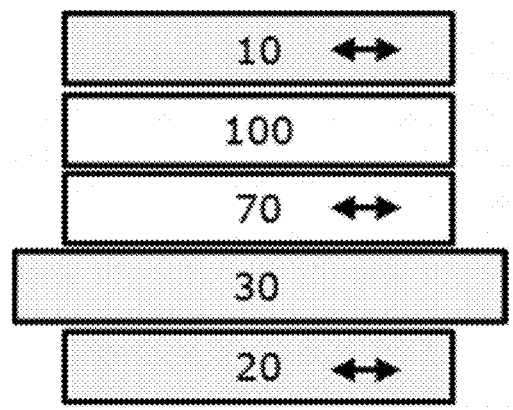
[Figure 3]
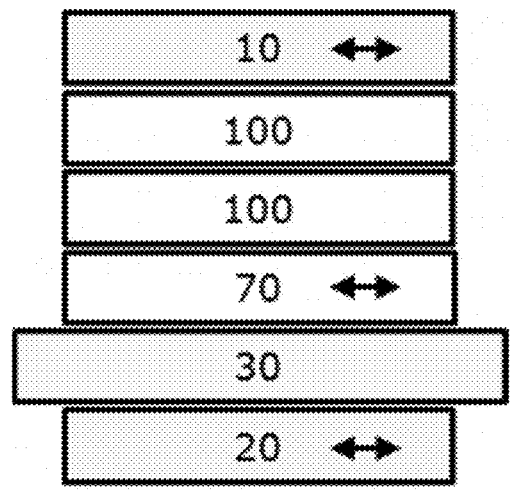

[Figure 4]
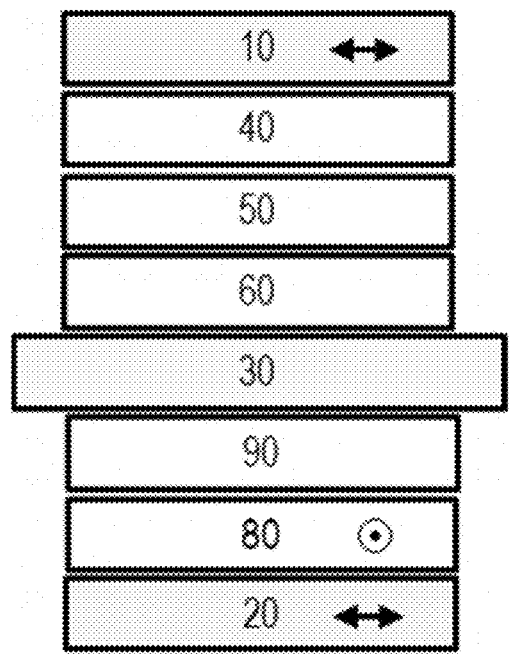
[Figure 5]
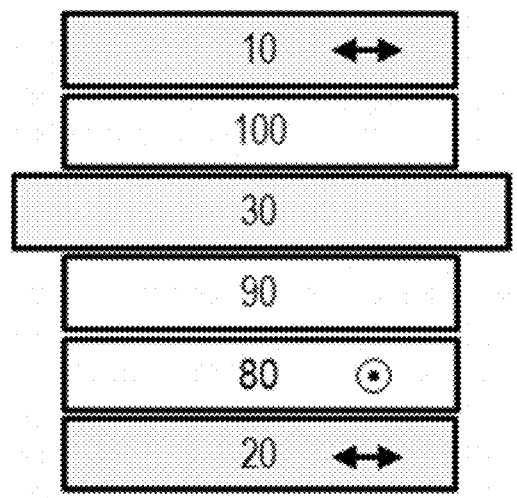

[Figure 6]
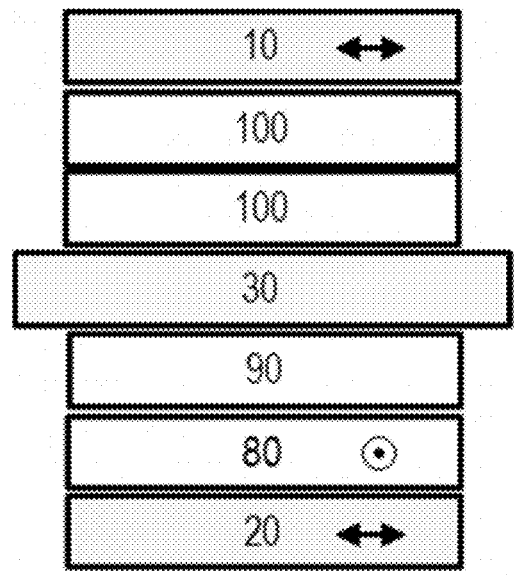
[Figure 7]
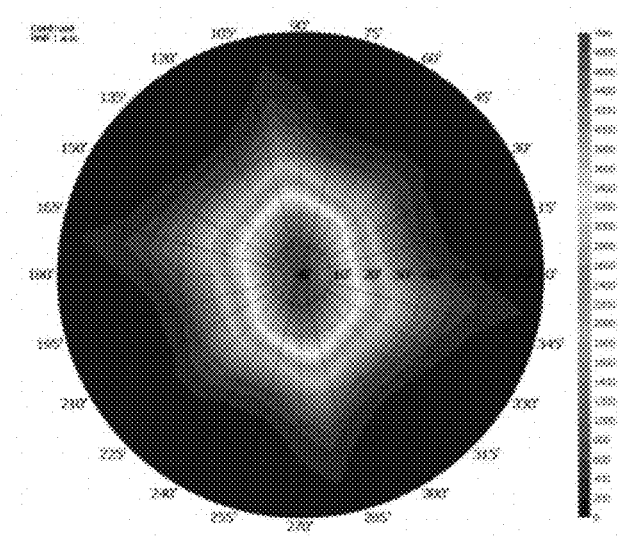

[Figure 8]
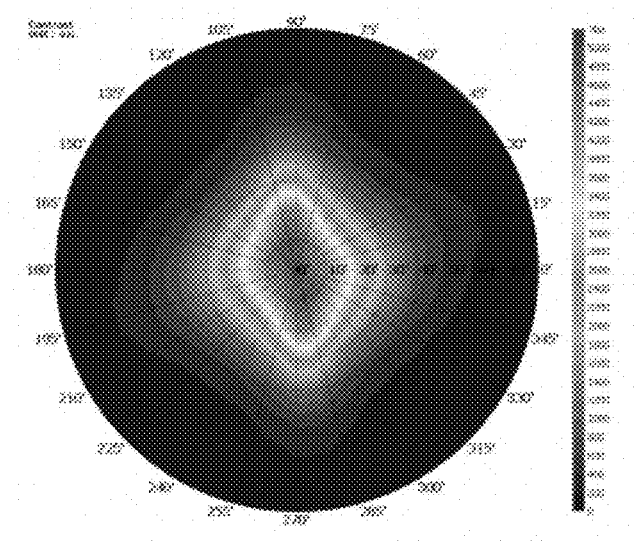
[Figure 9]
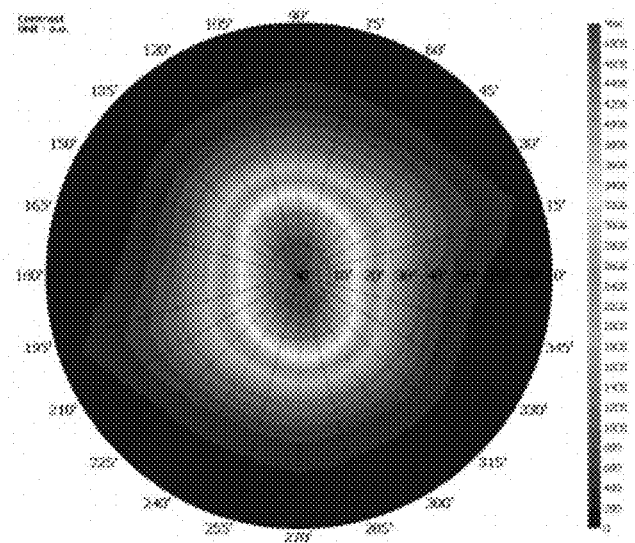

[Figure 10]
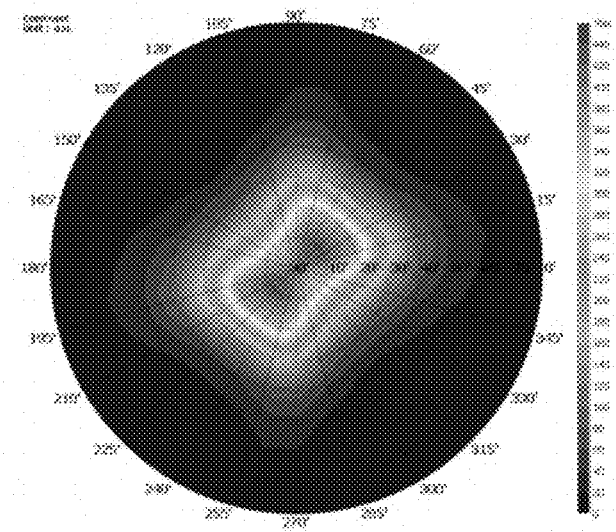
[Figure 11]
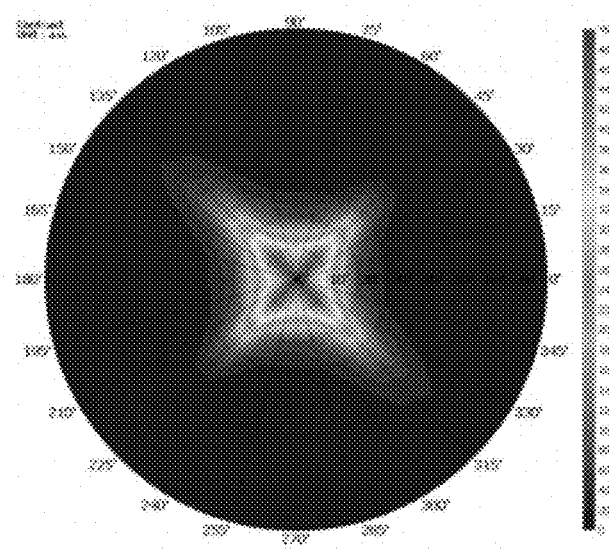

[Figure 12]
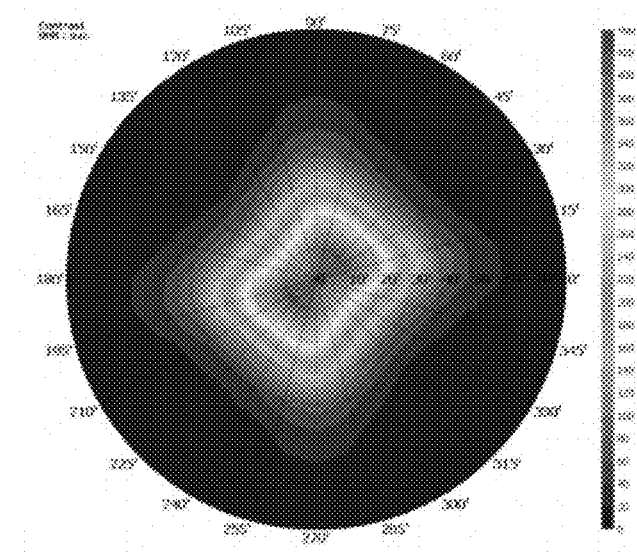
[Figure 13]
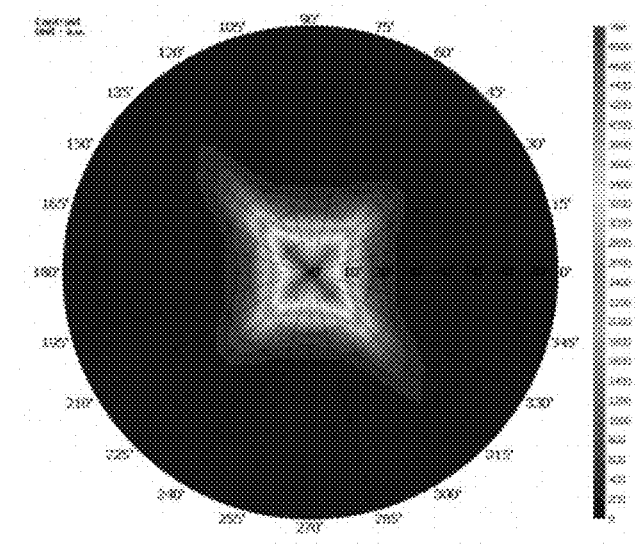

[Figure 14]
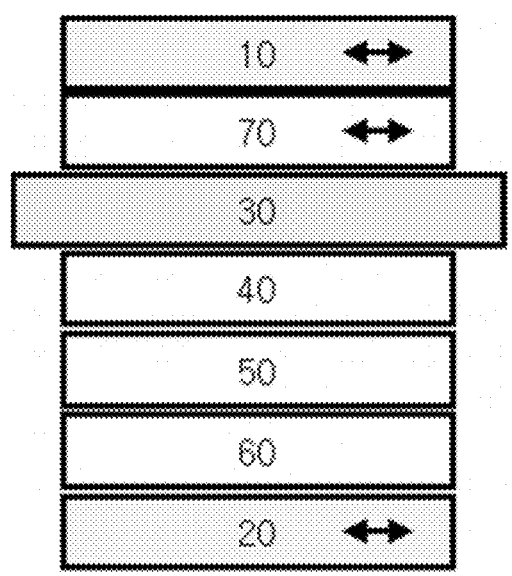

LIQUID CRYSTAL DISPLAY DEVICE

The present application is a National Phase entry pursuant to 35 U.S.C. § 371 of International Application No PCT/KR2019/006711 filed on Jun. 4, 2019, and claims priority to and the benefit of Korean Patent Application No. 10-2018-0064882 filed in the Korean Intellectual Property Office on Jun. 5, 2018, the entire contents of which are incorporated herein by reference.

FIELD

This application relates to a liquid crystal display.

BACKGROUND

In recent years, as there has been a growing interest in information displays and demand for portable information medium to be used has increased, research and commercialization of a lightweight thin film flat panel display (FPD), which replaces an existing cathode ray tube (CRT) display device have been mainly carried out. In particular, among such flat panel display devices, a liquid crystal display (LCD) as a device for displaying an image using optical anisotropy of a liquid crystal is excellent in resolution, color display, and image quality, and is actively applied to a notebook or a desktop monitor.

In such a liquid crystal display, liquid crystal molecules of a liquid crystal layer are driven by a difference in voltage applied to a common electrode and a pixel electrode.

Liquid crystals have features such as dielectric anisotropy and refractive anisotropy. Dielectric anisotropy means that the degree of polarization induced by an electric field varies depending on long axis and short axis directions of the liquid crystal, and refractive anisotropy means that a refractive index varies depending on the long axis and short axis directions of the liquid crystal, which causes a polarization state to be changed because the refractive index perceived varies according to a direction when light passes through the liquid crystal molecules.

As a result, the liquid crystal display has a liquid crystal panel constituted by a pair of transparent insulating substrates formed by planes facing each other with the liquid crystal layer interposed therebetween as a required component and arbitrarily controls the polarization of the liquid crystal molecules through a change in electric field between respective electric field generating electrodes, and displays various images by using transmittance of light which is changed at this time.

In this case, a polarizer is located at each of upper and lower portions of the liquid crystal panel and the polarizer transmits the light of a polarization component, which coincides with a transmission axis, to determine a transmission degree of light by arrangement of transmission axes of two polarizers and arrangement characteristics of the liquid crystals.

The polarizer used in the liquid crystal display in the related art is mainly a PVA elongated type in which iodine ions are aligned through stretching by using polyvinyl alcohol (PVA) having good adsorption ability with iodine.

This application has been made in an effort to provide a liquid crystal display capable of resolving a size limitation of a polarizer and having an enhanced front contrast ratio (CR) characteristic.

SUMMARY

An embodiment of this application provides a liquid crystal display comprising: an upper polarizer; a lower polarizer; a liquid crystal panel provided between the upper polarizer and the lower polarizer; and a first half wave plate, a positive C plate, and a second half wave plate are sequentially provided between the upper polarizer and the liquid crystal panel; wherein the upper polarizer and the lower polarizer are provided such that absorption axes thereof are parallel to each other; and wherein the liquid crystal panel is a vertical alignment liquid crystal mode.

According to an embodiment of this application, absorption axes of an upper polarizer and a lower polarizer of a liquid crystal display are provided parallel to each other, thereby resolving a size limitation of a polarizer according to a width of a polarizer raw material.

Further, according to an embodiment of this application, the first half wave plate, the positive C plate, and the second half wave plate are provided between an upper polarizer and a liquid crystal panel, and as a result, black luminance is reduced due to scattering of side light to increase a front contrast ratio (CR) as compared with a case where the first half wave plate, the positive C plate, and the second half wave plate are provided between a lower polarizer and the liquid crystal panel.

Further, according to an embodiment of this application, the positive C plate is provided between the first half wave plate and the second half wave plate to minimize reduction of a contrast ratio (CR) at a viewing angle.

BRIEF DESCRIPTION OF THE DRAWINGS

FIG. 1 is a schematic illustration of a structure of a liquid crystal display of Example 1 according to an embodiment of this application.

FIG. 2 is a schematic illustration of a structure of a liquid crystal display of Comparative Example 1 according to an embodiment of this application.

FIG. 3 is a schematic illustration of a structure of a liquid crystal display of Comparative Example 2 according to an embodiment of this application.

FIG. 4 is a diagram schematic illustration of a liquid crystal display of Example 2 according to an embodiment of this application.

FIG. 5 is a schematic illustration of a structure of a liquid crystal display of Comparative Example 3 according to an embodiment of this application.

FIG. 6 is a schematic illustration of a structure of a liquid crystal display of Comparative Example 4 according to an embodiment of this application.

FIG. 7 is a diagram illustrating omnidirectional CRs of a liquid crystal display of Example 1.

FIG. 8 is a diagram illustrating omnidirectional CRs of a liquid crystal display of Example 2.

FIG. 9 is a diagram illustrating omnidirectional CRs of a liquid crystal display of Example 3.

FIG. 10 is a diagram illustrating omnidirectional CRs of a liquid crystal display of Comparative Example 1.

FIG. 11 is a diagram illustrating omnidirectional CRs of a liquid crystal display of Comparative Example 2.

FIG. 12 is a diagram illustrating omnidirectional CRs of a liquid crystal display of Comparative Example 3.

FIG. 13 is a diagram illustrating omnidirectional CRs of a liquid crystal display of Comparative Example 4.

FIG. 14 is a schematic illustration of a structure of a liquid crystal display of Comparative Example 5 according to an embodiment of this application.

EXPLANATION OF REFERENCE NUMERALS AND SYMBOLS

10: Upper polarizer
20: Lower polarizer

30: Liquid crystal panel
40: First half wave plate
50: Positive C plate
60: Second half wave plate
70: Negative B plate
80: Positive A plate
90: Negative C plate
100: half wave plate

DETAILED DESCRIPTION

Hereinafter, preferred embodiments of this application will be described. However, the embodiments of this application may be modified into various other forms, and the scope of this application is not limited to the embodiments described below. Further, the embodiments of this application are provided for more completely describing this application to those having average knowledge in the art.

In this specification, a case where a part "comprises" an element will be understood to imply the inclusion of stated elements but not the exclusion of any other elements unless explicitly described to the contrary.

In a liquid crystal display in the related art, an absorption axis of any one polarizer of an upper polarizer and a lower polarizer is set to 0 degree and the absorption axis of the other one polarizer is set to 90 degrees and the absorption axes of the upper polarizer and the lower polarizer are orthogonal to each other. However, when the absorption axis of the polarizer is 90 degrees, a horizontal length of the polarizer is limited by a width of a roll of material that is used to manufacture the polarizer, which becomes a limiting factor for enlarging product size. A maximum width of the roll of material that is used to manufacture a current polarizer is approximately 2600 mm, which means that a maximum size of a 21:9 standard TV is approximately 110 inches.

In order to improve the limitation on the size of such a polarizer, a method for transversely stretching a polyvinyl alcohol (PVA) film to form the absorption axis of a polarizer roll in the transverse direction (TD) is proposed. However, even in such a case, unevenness due to lowering of the uniformity of the transverse stretching may occur and the degree of polarization due to the lowering of a stretching ratio may be reduced.

Thus, in this application, the absorption axes of the upper polarizer and the lower polarizer of the liquid crystal display are all set to 0 degree, thereby resolving the size limitation of the polarizer according to the width of the polarizer raw material.

A liquid crystal display according to an embodiment of this application comprises: an upper polarizer; a lower polarizer; and a liquid crystal panel provided between the upper polarizer and the lower polarizer, the upper polarizer and the lower polarizer are provided so that absorption axes of the upper and lower polarizers are parallel to each other, a first half wave plate, a positive C plate, and a second half wave plate are sequentially provided between the upper polarizer and the liquid crystal panel, and the liquid crystal panel is a vertical alignment liquid crystal mode.

In this application, the upper polarizer and the lower polarizer are provided such that the absorption axes thereof are parallel to each other. As described above, both of the absorption axes of the upper polarizer and the lower polarizer may be 0 degree in order to resolve the size limitation of the polarizer according to a width of a polarizer raw material.

In this application, the case where the liquid crystal display comprises a first half wave plate, a positive C plate, and a second half wave plate between the upper polarizer and the liquid crystal panel is more preferable than the case where the liquid crystal display comprises the first half wave plate, the positive C plate, and the second half wave plate between the lower polarizer and the liquid crystal panel.

In this application, in regard to the upper polarizer and the lower polarizer, the polarizer attached to a TFT glass surface, which is a lower portion of the liquid crystal panel, based on the liquid crystal panel, is referred to as the lower polarizer and the polarizer attached to an upper portion of the liquid crystal panel which is the opposite side thereof is referred to as the upper polarizer.

Light emitted from a backlight unit (BLU) and incident on the lower polarizer has a black luminance rising element at a front due to scattering inside a cell in a lower panel. In this case, scattered light may be absorbed by the polarizer of an upper plate as long as there is no retardation of a lower plate. So that, as compared with the case where the liquid crystal display comprises the first half wave plate, the positive C plate, and the second half wave plate between the lower polarizer and the liquid crystal panel, when the liquid crystal display comprises the first half wave plate, the positive C plate, and the second half wave plate between the upper polarizer and the liquid crystal panel, the black luminance is reduced due to side light scattering, and as a result, a front CR is raised.

Further, in an embodiment of this application, the angle formed between the optical axis of the half wave plate of any one of the first half wave plate and the second half wave plate and the absorption axis of the upper polarizer may be 17.5 to 27.5 degrees, and may be 20 to 25 degrees. The angle formed between the optical axis of the other one half wave plate and the absorption axis of the upper polarizer may be 62.5 to 72.5 degrees, and may be 65 to 70 degrees. When the angle deviates from the angle, 90-degree linearly polarized light conversion may not be made (e.g., 0 degree→90 degrees), and as a result, the optical axis is not orthogonal to the absorption axis of the upper polarizer and light leakage occurs in black, and thus CR drops. As an ideal optical-axis angle, the angle formed between the optical axis of the first half wave plate and the absorption axis of the upper polarizer is 22.5 degrees, and the angle formed between the optical axis of the second half wave plate and the absorption axis of the upper polarizer is 67.5 degrees, The reason for setting these angles is that consideration is given to manufacturing tolerance of a general optical film.

The first half wave plate and the second half wave plate may be made of materials known in the art and is not particularly limited. For example, polyolefin (polyethylene, polypropylene, polynorbornene and the like), amorphous polyolefin, polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, cellulose-based polymer (such as triacetyl cellulose), PVA, epoxy resin, phenol resin, norbornene resin, polyester resin, acrylic resin, vinyl chloride resin, vinylidene chloride resin, etc., may be singly used or two or more thereof may be mixedly used, but this application is not limited thereto.

The first half wave plate and the second half wave plate may be obtained by forming the resin compositions and performing uniaxial or biaxial stretching. Further, as the first half wave plate and the second half wave plate, an alignment film in which a liquid crystalline polymer or a liquid crystalline monomer is aligned, may be used.

The first half wave plate and the second half wave plate are retarders in which the retardation is implemented as half, so that the relative phase difference between the e-ray and the o-ray becomes π. The phase difference may be represented as Δnd and the half wave plate may be manufactured by adjusting a thickness according to Δn of a material.

In an embodiment of this application, independently, in each of the first half wave plate and the second half wave plate, it is preferable that an $R_o(550)$ value is larger than an $R_o(450)$ value. The $R_o(450)$ may mean the front retardation value in 450 nm, $R_o(550)$ may mean the front retardation value in 550 nm, and the front retardation value $R_o$ may be represented by Equation 8 below.

$$R_o = (n_x - n_y) \times d \qquad \text{[Equation 8]}$$

In Equation 8 above, $n_x$ represents a refractive index in a direction in which a plane-direction refractive index of the first half wave plate or the second half wave plate becomes the maximum, $n_y$ represents a vertical refractive index in an $n_x$ direction in a plane direction of the first half wave plate or the second half wave plate, and d represents a thickness of the first half wave plate or the second half wave plate.

More specifically, independently in each of the first half wave plate or the second half wave plate, an $R_o(450)/R_o(550)$ value may be in the range of 0.8 to 0.9.

In an embodiment of this application, the positive C plate is provided between the first half wave plate and the second half wave plate.

In this application, the positive C plate means a film having a refractive index distribution of $n_z > n_x = n_y$. In this case, $n_x$ represents a refractive index in a direction in which a plane-direction refractive index of the film becomes maximum, $n_y$ represents a refractive index in a vertical direction in respects to an $n_x$ direction in a plane direction of the film, and $n_z$ represents a thickness-direction refractive index of the film.

The positive C plate which is known to the art may be used and is not particularly limited. More specifically, the positive C plate may be prepared by aligning a polymer film using an appropriate method or may be prepared by coating a polymerizable cholesteric liquid crystal compound on one surface of a substrate, aligning the polymer film in a predetermined direction, and then curing. When the polymerizable cholesteric liquid crystal compound is used, a zero retardation film may be used as the substrate. In this application, the zero retardation film means a film in which substantially no retardation occurs even though light is transmitted.

A thickness-direction retardation value $R_{th}$ of the positive C plate, which is represented by Equation 1 below in 550 nm may be in the range of 50 to 190 nm. Further, the front retardation value $R_o$ of the positive C plate, which is represented by Equation 2 below in 550 nm may be in the range of −5 to 5 nm or may be 0.

$$R_{th} = [n_z - (n_x + n_y)/2] \times d \qquad \text{[Equation 1]}$$

$$R_o = (n_x - n_y) \times d \qquad \text{[Equation 2]}$$

In Equations 1 and 2 above, $n_x$ represents a refractive index in a direction in which the plane-direction refractive index of the positive C plate becomes maximum, $n_y$ represents the vertical refractive index in the $n_x$ direction in the plane direction of the positive C plate, $n_z$ represents the thickness-direction refractive index of the positive C plate, and d represents a thickness of the positive C plate.

When the retardation value is out of the range, front black luminance is increased due to asymmetry of a viewing angle, and as a result, the CR may drop.

In an embodiment of this application, a first viewing angle compensation film may be additionally comprised between the second half wave plate and the liquid crystal panel and the first viewing angle compensation film may comprise a negative B plate.

In this application, the negative B plate means a film having a refractive index distribution of $n_x > n_y > n_z$. In this case, $n_x$ represents a refractive index in a direction in which a plane-direction refractive index of the film becomes maximum, $n_y$ represents a refractive index in a vertical direction in respects to an $n_x$ direction in a plane direction of the film, and $n_z$ represents a thickness-direction refractive index of the film.

The thickness-direction retardation value $R_{th}$ of the negative B plate, which is represented by Equation 3 below in 550 nm may be in the range of −230 to −330 nm. Further, the front retardation value $R_o$ of the negative B plate, which is represented by Equation 4 below in 550 nm may be in the range of 10 to 110 nm.

$$R_{th} = [n_z - (n_x + n_y)/2] \times d \qquad \text{[Equation 3]}$$

$$R_o = (n_x - n_y) \times d \qquad \text{[Equation 4]}$$

In Equations 3 and 4 above, $n_x$ represents a refractive index in a direction in which the plane-direction refractive index of the negative B plate becomes maximum, $n_y$ represents the refractive index in the vertical direction in respects to the $n_x$ direction in the plane direction of the negative B plate, $n_z$ represents the thickness-direction refractive index of the negative B plate, and d represents a thickness of the negative B plate.

In an embodiment of this application, a second viewing angle compensation film may be additionally comprised between the liquid crystal panel and the lower polarizer and the second viewing angle compensation film may comprise a positive A plate and a negative C plate.

In this application, the positive A plate means a film having a refractive index distribution of $n_x > n_y = n_z$ and the negative C plate means a film having a refractive index distribution of $n_x = n_y > n_z$. In this case, $n_x$ represents a refractive index in a direction in which a plane-direction refractive index of the film becomes maximum, $n_y$ represents a refractive index in a vertical direction in respects to an $n_x$ direction in a plane direction of the film, and $n_z$ represents a thickness-direction refractive index of the film.

The front retardation value $R_o$ of the positive A plate, which is represented by Equation 5 below in 550 nm may be in the range of 90 to 190 nm.

$$R_o = (n_x - n_y) \times d \qquad \text{[Equation 5]}$$

In Equation 5 above, $n_x$ represents a refractive index in a direction in which the plane-direction refractive index of the positive A plate becomes maximum, $n_y$ represents the refractive index in the vertical direction in respects to the $n_x$ direction in the plane direction of the positive A plate, and d represents a thickness of the positive A plate.

When the retardation value is out of the range, the CR may drop due to the light leakage in a black state because retardation compensation of the vertically aligned liquid crystals is not completely made at a viewing angle.

The thickness-direction retardation value $R_{th}$ of the negative C plate, which is represented by Equation 6 below in 550 nm may be in the range of −160 to −260 nm. Further, the front retardation value $R_o$ of the positive C plate, which is represented by Equation 7 below in 550 nm may be in the range of −5 to 5 nm or may be 0.

$$R_{th}=[n_z-(n_x+n_y)/2]\times d \quad \text{[Equation 6]}$$

$$R_o=(n_x-n_y)\times d \quad \text{[Equation 7]}$$

In Equations 6 and 7 above, $n_x$ represents a refractive index in a direction in which the plane-direction refractive index of the negative C plate becomes maximum, $n_y$ represents the refractive index in the vertical direction in respects to the $n_x$ direction in the plane direction of the negative C plate, $n_z$ represents the thickness-direction refractive index of the negative C plate, and d represents a thickness of the negative C plate.

When the retardation value is out of the range, the CR may drop due to the light leakage in a black state because retardation compensation of the vertically aligned liquid crystals is not completely made at a viewing angle.

In an embodiment of this application, the upper polarizer, the lower polarizer, the liquid crystal panel, the first half wave plate, the positive C plate, and the second half wave plate may be bonded by using a water-based adhesive or a UV curing adhesive or bonded by using a PSA adhesive.

In this application, the upper polarizer and the lower polarizer may be polyvinyl alcohol based polarizers in which at least one of iodine and dichroic dyes is individually dyed.

As an example of the method for preparing the polyvinyl alcohol based polarizer, a method comprising a step of preparing a polyvinyl alcohol based polarizer in which iodine and/or a dichroic dye is dyed and a step of laminating a protective film on one surface of the polarizer may be used. For example, the method is not limited thereto, but the step of preparing the polyvinyl alcohol based polarizer may comprise a dyeing step of dyeing the polyvinyl alcohol based polymer film with the iodine and/or the dichroic dye, a cross-linking step of cross-linking the polyvinyl alcohol based film and the dye, and a stretching step of stretching the polyvinyl alcohol based film.

A film for protecting the polarizer refers to a transparent film attached on one surface of the polarizer and may adopt a film which is excellent in mechanical strength, thermal stability, moisture shielding property, isotropy, and the like. For example, an acetate based film such as triacetyl cellulose (TAC), and polyester based, polyether sulfone based, polycarbonate based, polyamide based, polyimide based, polyolefin based, cycloolefin based, polyurethane based, and acryl based resin films may be used, but this application is not limited thereto.

In addition, the protective film may be an isotropic film, may be an anisotropic film having an optical compensation function such as the phase difference, or may be composed of one sheet or may be composed of two or more sheets bonded together. Further, the protective film may be an unstretched, uniaxially or biaxially stretched film, and the thickness of the protective film is generally 1 to 500 μm and preferably 1 to 300 μm.

Meanwhile, in the step of laminating the protective film on one surface of the polyvinyl alcohol based polarizer, the protective film is bonded to the polarizer and the protective film may be bonded to the polarizer by using the adhesive. In this case, the bonding may be performed through a joining method of the film well known to the art and for example, the bonding may be performed by using adhesives well known to the art, which comprise the aqueous adhesive such as the polyvinyl alcohol based adhesive, a thermosetting adhesive such as the urethane based adhesive, etc., a photocation curable adhesive such as the epoxy based adhesive, etc., and optical radical curable adhesives such as the acryl based adhesive, etc.

The liquid crystal display according to an embodiment of this application may additionally comprise a backlight unit. The backlight unit serves to supply light to the liquid crystal panel and a light source of the backlight unit may adopt any one of a cold cathode fluorescent lamp (CCFL), an external electrode fluorescent lamp (EEFL), a fluorescent lamp of a hot cold fluorescent lamp (HCFL), or a light emitting diode (LED).

In an embodiment of this application, the liquid crystal panel may be a vertical alignment (VA) mode liquid crystal panel.

The liquid crystal display according to an embodiment of this application may have the following structures, but is not limited only thereto.

1) Structure of the upper polarizer/the first half wave plate/the positive C plate/the second half wave plate/the liquid crystal panel/the lower polarizer 2) Structure of the upper polarizer/the first half wave plate/the positive C plate/the second half wave plate/the negative B plate/the liquid crystal panel/the lower polarizer 3) Structure of the upper polarizer/the first half wave plate/the positive C plate/the second half wave plate/the liquid crystal panel/the negative B C plate/the positive A plate/the lower polarizer Further, the types of other constituent elements constituting the liquid crystal display, for example, upper and lower substrates (e.g., color filter substrate or array substrate) are not also particularly limited, and the configurations known in this field may be adopted without the limitation.

EXAMPLES

Hereinafter, the present invention will be described in more detail with reference to examples. The following Examples are provided to aid understanding of the present invention and are not thus intended to limit the present invention.

EXAMPLES

Example 1

A first half wave plate having an optical axis of 22.5 degrees, the positive C plate, a second half wave plate having an optical axis of 67.5 degrees, and the negative B plate were sequentially laminated on a PVA layer having an absorption axis of 0 degree. The laminate was positioned at an upper portion of a VA panel and a general polarizer having an absorption axis of 0 degree was configured to be positioned at an opposite side to the VA panel.

At this time, each of the first half wave plate and the second half wave plate had a wavelength dispersibility of $R_o(450)/R_o(550)=0.86$. Further, the positive C plate had a positive C plate having a thickness-direction retardation value of 140 nm and a front retardation value of 0. Further, the negative B plate had a negative B plate having a thickness-direction retardation value of −280 nm and a front retardation value of 60 nm.

The structure of Example 1 is schematically illustrated in FIG. 1, wherein the structure having upper polarizer (10), lower polarizer (20), liquid crystal panel (30), first half wave plate (40), positive C plate (50), second half wave plate (60), and negative B plate (70), is shown.

Comparative Example 1

A half wave plate having an optical axis of 45 degrees and the negative B plate were sequentially laminated on the PVA layer having the absorption axis of 0 degree. The laminate was positioned at an upper portion of a VA panel and a general polarizer having an absorption axis of 0 degree was configured to be positioned at an opposite side to the VA panel.

At this time, the half wave plate had a half wave plate having a wavelength dispersibility of $R_o(450)/R_o(550)=0.86$. Further, the negative B plate had a thickness-direction retardation value of −280 nm and a front retardation value of 60 nm.

The structure of Comparative Example 1 is schematically illustrated in FIG. 2, wherein the structure having upper polarizer (10), lower polarizer (20), liquid crystal panel (30), first half wave plate (40), negative B plate (70), and half wave plate (100), is shown.

Comparative Example 2

Like the structure of FIG. 3, Comparative Example 2 was performed similarly to Example 1 without adopting the positive C plate. FIG. 3 illustrates the structure, wherein the structure having upper polarizer (10), lower polarizer (20), liquid crystal panel (30), negative B plate (70), and half wave plates (100), is shown Example 2

A first half wave plate having an optical axis of 22.5 degrees, the positive C plate, and a second half wave plate having an optical axis of 67.5 degrees were sequentially laminated on a PVA layer having an absorption axis of 0 degree. The laminate was configured to be positioned at the upper portion of the VA panel.

The positive A plate and the negative C plate were sequentially laminated on the PVA layer having the absorption axis of 0 degree. The laminate was positioned at a lower portion of the VA panel so that the negative C plate is provided on the VA panel.

At this time, each of the first half wave plate and the second half wave plate had a wavelength dispersibility of $R_o(450)/R_o(550)=0.86$. Further, the positive C plate had a positive C plate having a thickness-direction retardation value of 140 nm and a front retardation value of 0. Further, the positive A plate adopted a positive A plate having a front retardation value of 140 nm. Further, the negative C plate had a negative C plate having a thickness-direction retardation value of −211 nm and a front retardation value of 0.

The structure of Example 2 is schematically illustrated in FIG. 4, wherein the structure having upper polarizer (10), lower polarizer (20), liquid crystal panel (30), first half wave plate (40), positive C plate (50), second half wave plate (60), positive A plate (80), and negative C plate (90), is shown.

Example 3

Example 3 was performed similarly to Example 2 except that a positive A plate having a front retardation value of 168 nm was adopted in Example 2.

Comparative Example 3

A half wave plate having an optical axis of 45 degree was sequentially laminated on the PVA layer having the absorption axis of 0 degree. The laminate was configured to be positioned at the upper portion of the VA panel.

The positive A plate and the negative C plate were sequentially laminated on the PVA layer having the absorption axis of 0 degree. The laminate was positioned at a lower portion of the VA panel so that the negative C plate is provided on the VA panel.

At this time, the half wave plate had a wavelength dispersibility of $R_o(450)/R_o(550)=0.86$. Further, the positive A plate had a front retardation value of 140 nm. Further, the negative C had a thickness-direction retardation value of −211 nm and a front retardation value of 0.

The structure of Comparative Example 3 is schematically illustrated in FIG. 5, wherein the structure having upper polarizer (10), lower polarizer (20), liquid crystal panel (30), positive A plate (80), and half wave plate (100), is shown.

Comparative Example 4

Like the structure of FIG. 6, Comparative Example 4 was performed similarly to Example 2 without adopting the positive C plate.

Comparative Example 5

The negative B plate was sequentially laminated on the PVA layer having the absorption axis of 0 degree. The laminate was configured to be positioned at the upper portion of the VA panel.

A second half wave plate having an optical axis of 67.5 degrees, the positive C plate, and a first half wave plate having an optical axis of 22.5 degrees were sequentially laminated on the PVA layer having the absorption axis of 0 degree. The laminate was attached to the lower portion of the VA panel so that the first half wave plate was provided on the VA panel.

At this time, each of the first half wave plate and the second half wave plate had wavelength dispersibility of $R_o(450)/R_o(550)=0.86$. Further, the positive C plate had a thickness-direction retardation value of 140 nm and a front retardation value of 0. Further, the negative B plate had a thickness-direction retardation value of −280 nm and a front retardation value of 60 nm.

The structure of Comparative Example 5 is schematically illustrated in FIG. 14, wherein the structure having upper polarizer (10), lower polarizer (20), liquid crystal panel (30), first half wave plate (40), positive C plate (50), second half wave plate (60), and negative B plate (70), is shown.

Experimental Example

Omnidirectional CR simulations were performed by using a Techwiz LCD 1D program with respect to the liquid crystal displays of Examples 1 to 3 and Comparative Examples 1 to 5. Front CR evaluation equipment of Example 1 and Comparative Example 5 performed measurement in an LCD TV by using EZ Contrast equipment of ELDIM.

Further, Omnidirectional CRs of the liquid crystal display of Example 1 above were illustrated in FIG. 7, omnidirectional CRs of the liquid crystal display of Example 2 above were illustrated in FIG. 8, and omnidirectional CRs of the liquid crystal display of Example 3 above were illustrated in FIG. 9.

Further, omnidirectional CRs of the liquid crystal display of Comparative Example 1 above were illustrated in FIG. 10 and omnidirectional CRs of the liquid crystal display of Comparative Example 2 above were illustrated in FIG. 11 below. Further, omnidirectional CRs of the liquid crystal display of Comparative Example 3 above were illustrated in FIG. 12 and omnidirectional CRs of the liquid crystal display of Comparative Example 4 above were illustrated in FIG. 13.

As shown through light characteristic results of Examples 1 and 2 and Comparative Examples 2 and 4, it can be clearly seen that a viewing angle contrast ratio (CR) characteristic is enhanced in a structure of this application in which the positive C plate is positioned between the first half wave plate and the second half wave plate. Moreover, when Examples 1 and 2 and Comparative Examples 1 and 3 are compared with each other, it can be seen that front and viewing angle characteristics are enhanced in configuring in the structure of this application as compared with a product adopting one sheet by setting the optical axis of the half wave plate to 45 degrees.

Further, front optical characteristics of the liquid crystal displays of Example 1 and Comparative Example 5 above are illustrated in Table 1 below.

TABLE 1

|  | Black luminance | CR |
| --- | --- | --- |
| Comparative Example 5 | 100% | 100% |
| Example 1 | 62% | 159% |

Here, CR represents a contrast ratio representing a white luminance/black luminance value, and the data shows a relative ratio of the black luminance and the CR value at the front having an azimuth angle of 0 degree and a polar angle of 0 degree. Through Example 1 above, it may be apparently known that in a case where the polarizer comprising a half wave plate is positioned at the upper portion of the panel, the CR increases by approximately 50% or more as compared with a case where the polarizer is positioned at the lower portion of the panel.

Like the result, according to an embodiment of this application, absorption axes of the upper polarizer and the lower polarizer of the liquid crystal display are provided to be parallel to each other, thereby resolving a size limitation of the polarizer according to the width of the polarizer raw material.

Further, according to an embodiment of this application, the first half wave plate, the positive C plate, and the second half wave plate are comprised between an upper polarizer and a liquid crystal panel, and as a result, black luminance is reduced due to scattering of side light to increase a front contrast ratio (CR) as compared with a case where the first half wave plate, the positive C plate, and the second half wave plate are provided between a lower polarizer and the liquid crystal panel.

Further, according to an embodiment of this application, the positive C plate is comprised between the first half wave plate and the second half wave plate to minimize reduction of a contrast ratio (CR) at a viewing angle.

The invention claimed is:

1. A liquid crystal display comprising:
an upper polarizer;
a lower polarizer;
a liquid crystal panel provided between the upper polarizer and the lower polarizer; and
a first half wave plate having an upper surface and a lower surface,
a positive C plate having an upper surface and a lower surface, and
a second half wave plate having an upper surface and a lower surface
wherein the upper surface of the second half wave plate is directly bonded to the lower surface of the positive C plate, and the upper surface of the positive C plate is directly bonded to the lower surface of the first half wave plate, and wherein the bonded first half wave plate, positive C plate and second half wave plate is provided between the upper polarizer and the liquid crystal panel,
wherein the first half wave plate and/or the second half wave plate have an $R_o(450)/R_o(550)$ value of 0.8 to 0.9, wherein the $R_o(450)$ is front retardation value in 450 nm, $R_o(550)$ is front retardation value in 550 nm, and the front retardation value $R_o$ is calculated according to Equation 8, $$R_o = (n_x - n_y) \times d \qquad \text{Equation 8:}$$

in Equation 8, $n_x$ is a refractive index in a direction in which the plane-direction refractive index of the wave plate becomes maximum, $n_y$ represents the vertical refractive index in the $n_x$ direction in the plane direction of the wave plate, $n_z$ represents the thickness-direction refractive index of the wave plate, and d represents a thickness of the wave plate;
wherein the upper polarizer and the lower polarizer are provided such that absorption axes thereof are parallel to each other; and
wherein the liquid crystal panel is a vertical alignment mode liquid crystal panel.

2. The liquid crystal display of claim 1, wherein an angle formed between an optical axis of any one of the first half wave plate and the second half wave plate and an absorption axis of the upper polarizer, is 17.5 degrees to 27.5 degrees, and
an angle formed between the optical axis of the other half wave plate and the absorption axis of the upper polarizer, is 62.5 degrees to 72.5 degrees.

3. The liquid crystal display of claim 1, wherein a thickness-direction retardation value $R_{th}$ of the positive C plate represented by Equation 1 below in 550 nm is 50 nm to 190 nm, and a front retardation value $R_o$ represented by Equation 2 below in 550 nm is −5 nm to 5 nm:

$$R_{th} = [n_z - (n_x + n_y)/2] \times d \qquad \text{[Equation 1]}$$

$$R_o = (n_x - n_y) \times d \qquad \text{[Equation 2]}$$

In Equations 1 and 2 above,
$n_x$ represents a refractive index in a direction in which the plane-direction refractive index of the positive C plate becomes maximum,
$n_y$ represents a refractive index in a vertical direction in respects to the $n_x$ direction in the plane direction of the positive C plate,
$n_z$ represents the thickness-direction refractive index of the positive C plate, and
d represents a thickness of the positive C plate.

4. The liquid crystal display of claim 1, wherein each of the upper polarizer and the lower polarizer is independently a polyvinyl alcohol based polarizer in which at least one of iodine and dichroic dyes is dyed.

5. The liquid crystal display of claim 1, wherein an upper surface of the lower polarizer is bonded directly to a lower surface of the liquid crystal panel.

6. The liquid crystal display of claim 1, wherein the first half wave plate, positive C plate and second half wave plate are directly bonded together with an adhesive.

7. The liquid crystal display of claim 1, further comprising:
a first viewing angle compensation film between the second half wave plate and the liquid crystal panel.

8. The liquid crystal display of claim 7, wherein the first viewing angle compensation film comprises a negative B plate.

9. The liquid crystal display of claim 8, wherein a thickness-direction retardation value $R_{th}$ of the negative B plate represented by Equation 3 below in 550 nm is −230 nm to −330 nm and a front retardation value $R_o$ represented by Equation 4 below in 550 nm is 10 nm to 110 nm:

$$R_{th}=[n_z-(n_x+n_y)/2]\times d \qquad \text{[Equation 3]}$$

$$R_o=(n_x-n_y)\times d \qquad \text{[Equation 4]}$$

In Equations 3 and 4 above,
$n_x$ represents a refractive index in a direction in which the plane-direction refractive index of the negative B plate becomes maximum,
$n_y$ represents a refractive index in a vertical direction in respects to the $n_x$ direction in the plane direction of the negative B plate,
$n_z$ represents the thickness-direction refractive index of the negative B plate, and
d represents a thickness of the negative B plate.

10. The liquid crystal display of claim 1, further comprising:
a second viewing angle compensation film between the liquid crystal panel and the lower polarizer.

11. The liquid crystal display of claim 10, wherein the second viewing angle compensation film comprises a positive A plate and a negative C plate.

12. The liquid crystal display of claim 11, wherein the front retardation value $R_o$ of the positive A plate, which is represented by Equation 5 below in 550 nm 90 nm to 190 nm:

$$R_o=(n_x-n_y)\times d \qquad \text{[Equation 5]}$$

In Equation 5,
$n_x$ represents a refractive index in a direction in which the plane-direction refractive index of the positive A plate becomes maximum,
$n_y$ represents a refractive index in a vertical direction in respects to the $n_x$ direction in the plane direction of the positive A plate, and
d represents a thickness of the positive A plate.

13. The liquid crystal display of claim 11, wherein a thickness-direction retardation value $R_{th}$ of the negative C plate represented by Equation 6 below in 550 nm is −160 nm to −260 nm and a front retardation value $R_o$ represented by Equation 7 below in 550 nm is −5 nm to 5 nm:

$$R_{th}=[n_z-(n_x+n_y)/2]\times d \qquad \text{[Equation 6]}$$

$$R_o=(n_x-n_y)\times d \qquad \text{[Equation 7]}$$

In Equations 6 and 7 above,
$n_x$ represents a refractive index in a direction in which the plane-direction refractive index of the negative C plate becomes maximum,
$n_y$ represents a refractive index in a vertical direction in respects to the $n_x$ direction in the plane direction of the negative C plate,
$n_z$ represents the thickness-direction refractive index of the negative C plate, and
d represents a thickness of the negative C plate.

* * * * *